L. W. CHUBB.
METHOD OF FORMING COILS FOR ELECTRIC APPARATUS.
APPLICATION FILED JUNE 25, 1907.

999,749.

Patented Aug. 8, 1911.

WITNESSES:
C. L. Belcher
R. J. Dearborn

INVENTOR
Lewis W. Chubb
BY
ATTORNEY

UNITED STATES PATENT OFFICE.

LEWIS W. CHUBB, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF FORMING COILS FOR ELECTRIC APPARATUS.

999,749.  Specification of Letters Patent.  Patented Aug. 8, 1911.

Application filed June 25, 1907. Serial No. 380,710.

*To all whom it may concern:*

Be it known that I, LEWIS W. CHUBB, a citizen of the United States, and a resident of Wilkinsburg, in the county of Allegheny and State of Pennsylvania, have invented a new and useful Improvement in Methods of Forming Coils for Electric Apparatus, of which the following is a specification.

My invention relates to coils for electric apparatus and it has for its object to provide an improved method of forming and insulating edgewise-wound strap coils which are adapted for use in arc lamps, circuit breakers, the field magnet windings of dynamo-electric machines and various other relations.

In co-pending applications, filed of even date herewith and entitled respectively, "Processes for coating electric conductors" and "Systems for coating wires and cables," I have described continuous processes of producing very hard insulating films on the surfaces of aluminum wires and other conductors. These processes are particularly adapted to relatively small wires which may be readily wound into coils without injuring their insulating coatings.

According to my present invention, I provide a simple and effective method of forming and coating coils, such as those which are often used in the field magnet windings of dynamo-electric machines, having a number of turns of edgewise-wound strap conductor, with a very thin insulating oxid film.

Figure 1:
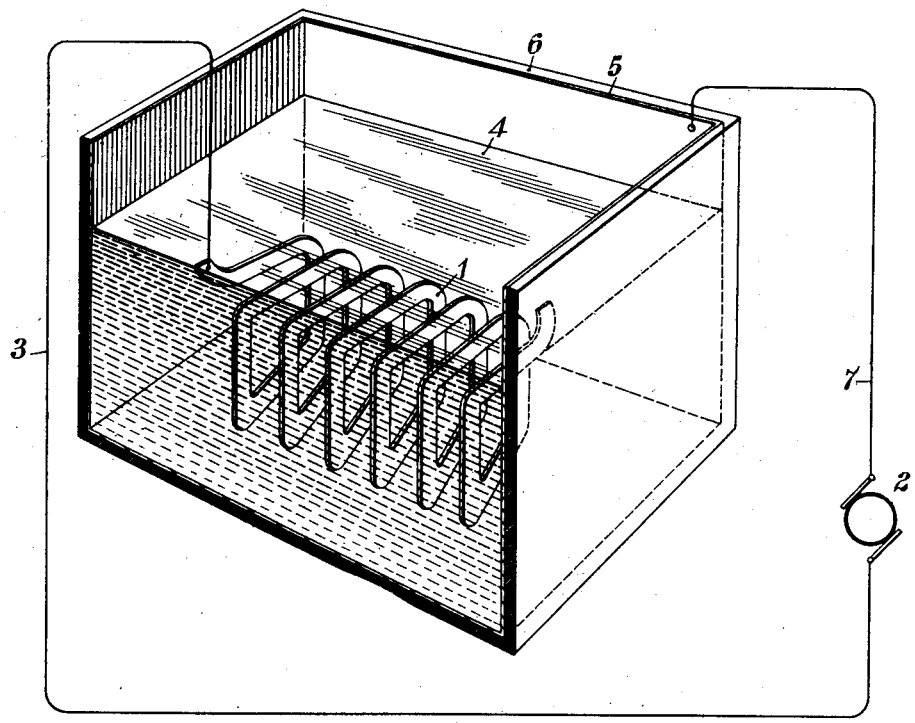
Figure 2:
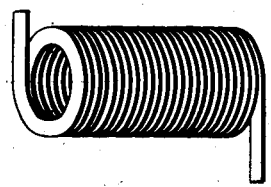
Figure 3:
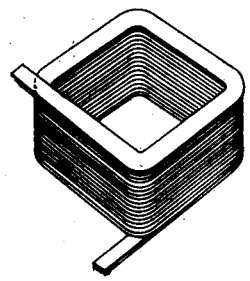

In the accompanying drawings, Figure 1 is a diagrammatic view of a coil undergoing the process of coating and the apparatus utilized in practicing the process and Figs. 2 and 3 are perspective views of different forms of completed coils.

Referring to the drawings, a suitable length of strap or a bar of aluminum or other conducting material is first bent into the form of an open helix. This bending process may be accomplished in any well known manner and the coil, in this condition, is next immersed in a bath of sodium silicate solution, ammonium borate solution or other suitable liquid which is capable of producing an electrolytic valve action. An electric current is then passed through the bath and through the helix, as one of the electrodes, thereby producing an insulating film on the surface of the latter that is capable of resisting the voltage strains which exist between the adjacent turns of the coil when it is completed.

An electric current may be supplied to the open helix 1 from a generator 2, or other suitable source, through a conductor 3, the circuit being completed from the helix through the bath 4 in which the coil is submerged, a metallic lining 5 of a tank or vessel 6 in which the bath is contained and a conductor 7 which is connected to the opposite terminal of the generator 2. A similar result may be effected by immersing two coils in a single bath and connecting them to opposite terminals of an alternating current source.

After the helix is finally treated electrolytically as above indicated its adjacent convolutions are forced into close proximity to each other.

It is conceivable that various modifications in the apparatus and method of practicing my invention may be effected without departing from the spirit of my invention.

I claim as my invention:

1. The method of constructing a coil for electric apparatus which consists in bending a conductor into an open helix, immersing the same in a bath of sodium silicate solution capable of producing an electrolytic valve action, passing an electric current through the helix as one electrode and through the bath to the other electrode, and finally forcing adjacent convolutions of the helix into close proximity.

2. The method of constructing an edgewise-wound aluminum strap coil for electric apparatus which consists in bending a strap conductor into an open helix, immersing the same in a bath of sodium silicate, passing an electric current through the helix as one electrode and through the bath to the other electrode, and finally pressing the adjacent convolutions of the helix into close proximity to each other.

In testimony whereof, I have hereunto subscribed my name this 20th day of June, 1907.

LEWIS W. CHUBB.

Witnesses:
R. D. DE WOLF,
BIRNEY HINES.